(12) United States Patent
Mellot et al.

(10) Patent No.: US 11,209,310 B2
(45) Date of Patent: Dec. 28, 2021

(54) DEPTH MAP SENSOR BASED ON DTOF AND ITOF

(71) Applicant: STMicroelectronics (Grenoble 2) SAS, Grenoble (FR)

(72) Inventors: Pascal Mellot, Lans en Vercors (FR); Laurent Plaza, Grenoble (FR); Jeannie Chinal, Saint Egreve (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 17/006,436

(22) Filed: Aug. 28, 2020

(65) Prior Publication Data

US 2021/0063240 A1 Mar. 4, 2021

(30) Foreign Application Priority Data

Aug. 30, 2019 (FR) ...................... 1909597

(51) Int. Cl.
*G01J 1/44* (2006.01)
*G06T 7/50* (2017.01)
*G06K 9/62* (2006.01)

(52) U.S. Cl.
CPC .............. *G01J 1/44* (2013.01); *G06K 9/6212* (2013.01); *G06T 7/50* (2017.01); *G01J 2001/442* (2013.01); *G01J 2001/4466* (2013.01); *G06T 2207/10028* (2013.01)

(58) Field of Classification Search
CPC .................. G01J 1/44; G01J 2001/442; G01J 2001/4466; G06T 7/50; G06T 2207/10028; G06K 9/6212; G01S 17/10; G01S 17/894; G01S 7/4865; G01S 7/4863

See application file for complete search history.

(56) References Cited

U.S. PATENT DOCUMENTS

2018/0299552 A1* 10/2018 Shu ..................... G01S 7/497
2019/0204148 A1 7/2019 Mellot

FOREIGN PATENT DOCUMENTS

EP 3370078 9/2018

OTHER PUBLICATIONS

Dutton, et al., "A time-correlated single-photon-counting sensor with 14GS/s Historgramming Time-to-Digital Converter," (2015), IEEE International Solid-State Circuits Conference, Session 11 (Year: 2015).*

* cited by examiner

*Primary Examiner* — Thanh Luu
*Assistant Examiner* — Monica T Taba
(74) *Attorney, Agent, or Firm* — Slater Matsil, LLP (57) ABSTRACT

The present disclosure relates to a depth map sensor including a light source for transmitting light pulses into an image scene; an array of pixel circuits, where each pixel circuit has a photodetector and three asynchronous counters; and a control circuit to control each of a plurality of groups of the pixel circuits of the array to generate a histogram of detection events by accumulating events during eight distinct time intervals between consecutive light pulses transmitted by the light source, such that the histogram comprises eight or more histogram bins.

20 Claims, 7 Drawing Sheets

DEPTH MAP SENSOR BASED ON DTOF AND ITOF

CROSS-REFERENCE TO RELATED APPLICATIONS

This application claims the benefit of French Patent Application No. 1909597, filed on Aug. 30, 2019, which application is hereby incorporated herein by reference.

TECHNICAL FIELD

The present disclosure relates generally to the field of time of flight (ToF) depth map sensors, and in particular to a circuit and method for direct ToF (dToF) and indirect ToF (iToF).

BACKGROUND

The ability of time-of-flight (ToF) cameras based on SPADs (Single Photon Avalanche Diodes) to provide precise photon arrival times makes them popular candidates for depth map sensors. Such ToF cameras generally comprise a laser source such as a vertical cavity surface-emitting laser (VCSEL) that emits, into an image scene, optical pulses or an optical waveform, and an array of SPADs for detecting the return signal.

In the case of direct ToF (dToF), the time delay of each return pulse with respect to the corresponding transmitted pulse is estimated in order to determine the time-of-flight, which can be converted into a distance measurement.

In the case of indirect ToF (iToF), the phase of the returned waveform is compared with that of the emitted waveform in order to estimate the time-of-flight, which is then converted into a distance measurement.

Current technology does not allow a high resolution depth map to be produced using dToF due to cost, area and power constraints. On the contrary, iToF is suited to providing relatively high resolution depth maps of up to 1 M pixel or more.

A drawback of iToF is that it is sensitive to optical cross-talk, and it is difficult to discriminate multiple targets.

There is thus a need in the art for a ranging device and method of ranging that provides improvements with respect to the prior art.

SUMMARY

According to one aspect, there is provided a depth map sensor comprising: at least one light source for transmitting light pulses into an image scene; an array of pixel circuits, each pixel circuit comprising at least one photodetector and at least three asynchronous counters; and a control circuit configured to control each of a plurality of groups of the pixel circuits of the array to generate a histogram of detection events by accumulating events during at least eight distinct time intervals between consecutive light pulses transmitted by the at least one light source, such that the histogram comprises eight or more histogram bins.

According to one embodiment, the control circuit is configured to control one or more first ones of the pixel circuits to accumulate in its at least three asynchronous counters detection events in at least three of said eight distinct time intervals, and to control one or more second ones of the pixel circuits to accumulate in its at least three asynchronous counters detection events in another at least three of said eight distinct time intervals.

According to one embodiment, the control circuit is configured to control, during a first cycle between the consecutive light pulses, the first pixel circuits to accumulate the events in the at least three distinct time intervals and the second pixel circuits to accumulate the events in the another at least three distinct time intervals.

According to one embodiment, the control circuit is configured to control, during a first cycle between two consecutive light pulses, the first pixel circuits to accumulate the events in the at least three distinct time intervals, and during a second cycle between a further two consecutive light pulses, the second pixel circuits to accumulate the events in the another at least three distinct time intervals.

According to one embodiment, during the first cycle, the control circuit is configured to control only pixel circuits to accumulate the events in the at least three distinct time intervals, and during the second cycle, the control circuit is configured to control only pixel circuits to accumulate the events in the another at least three distinct time intervals.

According to one embodiment, the at least one light source is a laser light source, such as a vertical cavity surface-emitting laser.

According to one embodiment, the photodetectors are single photon avalanche diodes.

According to a further aspect, there is provided a method of generating a histogram using a depth map sensor, the method comprising: transmitting light pulses into an image scene; and controlling each of a plurality of groups of pixel circuits of an array to generate a histogram of detection events by accumulating events during at least eight distinct time intervals between consecutive light pulses transmitted by the light source, such that the histogram comprises eight or more histogram bins, wherein each pixel circuit of the array has at least one photodetector and at least three asynchronous counters.

According to one embodiment, the method comprises controlling one or more first ones of the pixel circuits to accumulate in its at least three asynchronous counters detection events in at least three of said eight distinct time intervals, and controlling one or more second ones of the pixel circuits to accumulate in its at least three asynchronous counters detection events in another at least three of said eight distinct time intervals.

According to one embodiment, the method comprises controlling, during a first cycle between the consecutive light pulses, the first pixel circuits to accumulate the events in the at least three distinct time intervals and the second pixel circuits to accumulate the events in the another at least three distinct time intervals.

According to one embodiment, the method comprises controlling, during a first cycle between two consecutive light pulses, the first pixel circuits to accumulate the events in the at least three distinct time intervals, and during a second cycle between a further two consecutive light pulses, the second pixel circuits to accumulate the events in the another at least three distinct time intervals.

According to one embodiment, the method comprises controlling during the first cycle only pixel circuits to accumulate the events in the at least three distinct time intervals, and during the second cycle, only pixel circuits to accumulate the events in the another at least three distinct time intervals.

According to a further aspect, there is provided a method of correcting cross-talk in a depth map sensor, the method comprising: generating, using the above method, a histogram for a plurality of zones of the array of pixel circuit; generating, based on the histograms for the plurality of zones, cross-talk grid points representing cross-talk present in each of said zones; and correcting a depth map by subtracting, from one or more histogram bins generated during an indirect time of flight, iToF, operation, cross-talk estimations generated based on the cross-talk grid points.

According to a further aspect, there is provided a method of generating a depth map comprising: generating a first frame of macro pixels each comprising a histogram generated according to the above method based on a first duration of the at least eight distinct time intervals; and generating a second frame of macro pixels each comprising a histogram generated according to the above method based on a second duration of the at least eight distinct time intervals, wherein the first and second durations are not equal.

According to yet a further aspect, there is provided a method of generating a depth map comprising: generating a first frame of macro pixels each comprising a histogram generated according to the above method; and generating a second frame based on an indirect time of flight, iToF, operation of each pixel circuit of the array.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a depth map sensor as orientated during normal use.

Unless specified otherwise, the expressions "around", "approximately", "substantially" and "in the order of" signify within 10%, and preferably within 5%.

In the following disclosure, example embodiments are described with reference to a depth map sensor using a scanned VCSEL source. However, it will be apparent to those skilled in the art that the principles described herein apply equally to depth map sensors using different types of laser light source, which may or may not be scanned.

Figure 1:
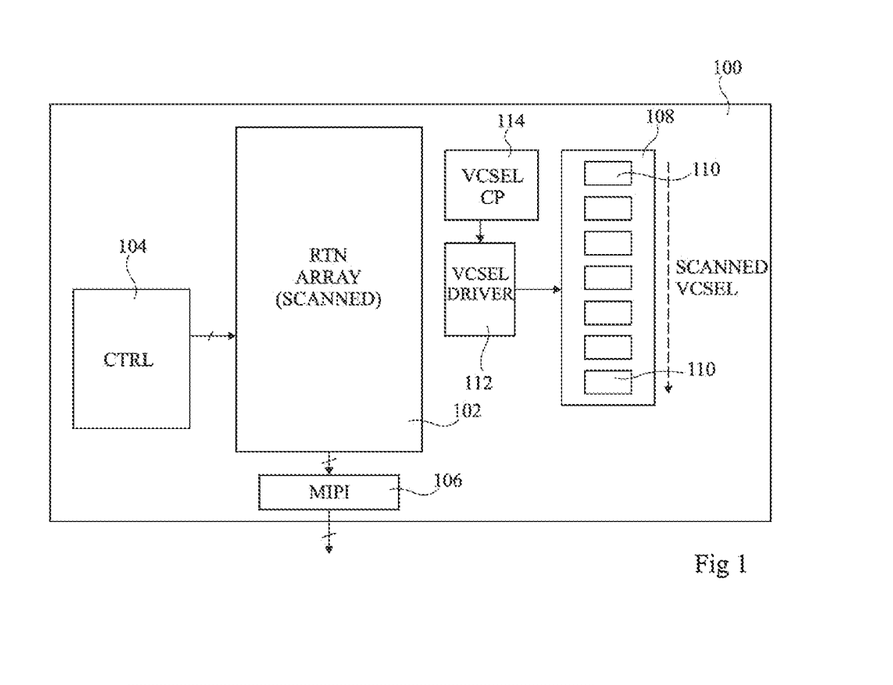
FIG. 1 schematically illustrates a depth map sensor according to an example embodiment of the present disclosure.

FIG. 1 schematically illustrates a depth map sensor 100 according to an example embodiment of the present disclosure.

The depth map sensor 100 comprises a return array (RTN ARRAY (SCANNED)) 102, which is for example a scanned array that is scanned in synchronization with an illumination of the scene. In some embodiments, the array 102 is a SPAD array. The array 102 is for example controlled by a control circuit (CTRL) 104, and provides output readings via an output circuit 106, which is for example a mobile industry processor interface (MIPI) or the like.

The image scene is for example illuminated by a scanned laser 108, which is for example a scanned vertical cavity surface emitting laser (SCANNED VCSEL). For example, the scanned VCSEL 108 comprises a plurality of VCSELs 110 arranged in an array, which is a 1 by 7 array in the example of FIG. 1. The VCSELs 110 of the scanned VCSEL 108 are for example driven by a VCSEL driver (VCSEL DRIVER) 112 using a voltage provided by a VCSEL charge pump (VCSEL CP) 114.

Figure 2:
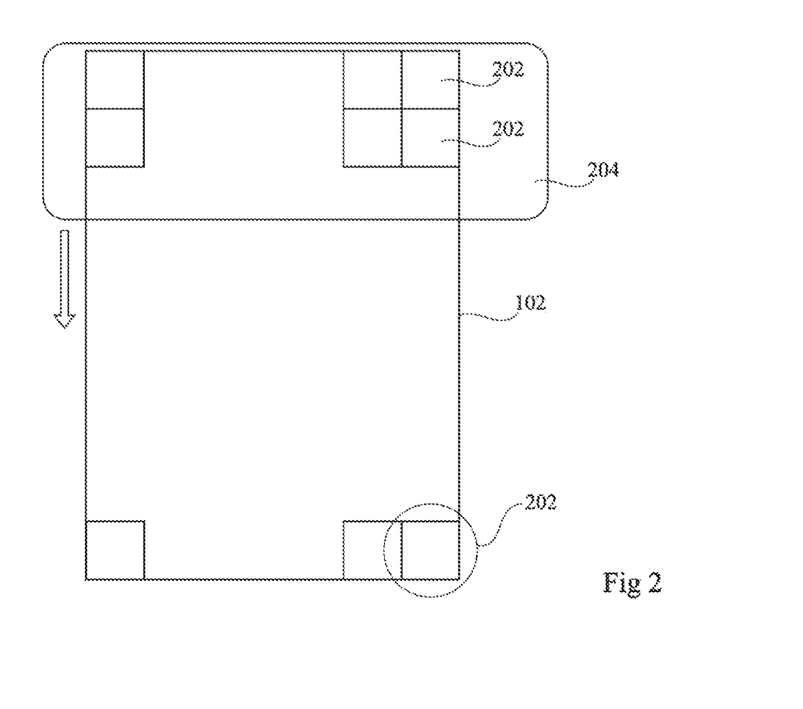
FIG. 2 schematically illustrates a SPAD array of the depth map sensor of FIG. 1 according to an example embodiment.

FIG. 2 schematically illustrates the SPAD array 102 of the depth map sensor of FIG. 1 according to an example embodiment. The SPAD array 102 is formed of an array of pixel circuits 202. A cluster of rows of the pixels circuits, represented by a rectangle 204 in FIG. 2, are for example illuminated and activated at once, and the clusters are for example activated in sequence from top to bottom as they are illuminated during the scanning operation, in synchronization with the illumination of corresponding VCSELs of the scanned VCSEL 108.

Figure 3:
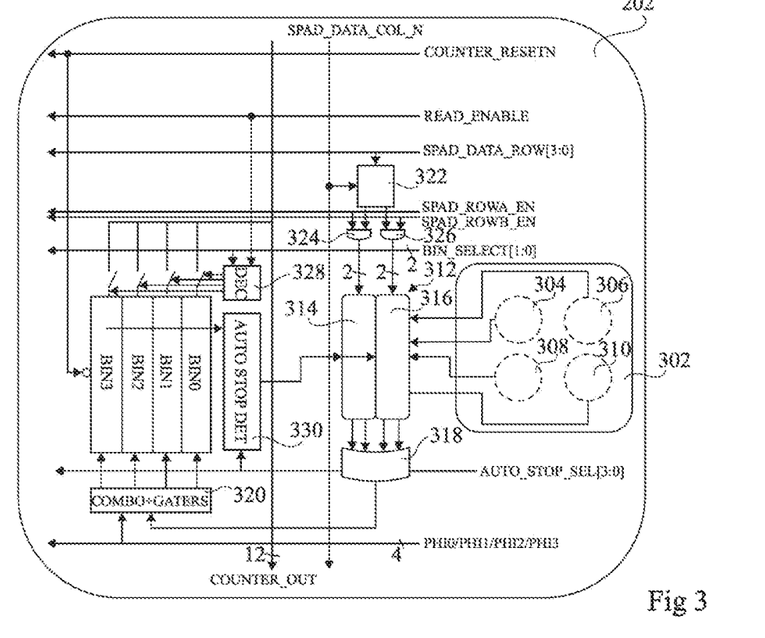
FIG. 3 schematically illustrates a pixel circuit of the SPAD array of FIG. 2 in more detail according to an example embodiment of the present disclosure.

FIG. 3 schematically illustrates a pixel circuit 202 of the SPAD array 102 of FIG. 2 in more detail according to an example embodiment of the present disclosure.

For example, each pixel circuit 202 comprises an arrangement 302 of one or more SPADs, and in the example of FIG. 3, the arrangement of SPADs 302 comprises four SPADs 304, 306, 308 and 310 arranged in a two-by-two arrangement.

The pixel circuit 202 also for example comprises three or more bins. In the example of FIG. 3, there are four bins BIN0, BIN1, BIN2, BIN3. Each bin is implemented for example by an asynchronous counter, which is reset by a signal COUNTER_RESETN.

Outputs from the SPADs 302 are provided to a dispatch circuit 312, which dispatches the outputs to the bins. In the example of FIG. 3, the dispatch circuit 312 comprises a first pair of quench readout circuits 314, a second pair of quench readout circuits 316, a four-input OR gate 318, and a combo and gaters circuit (COMBO+GATERS) 320, which combines phase signals to generate clock gating signals as described in more detail below.

For example, the circuits 314 receive the outputs of the SPADs 304 and 310 that are diagonally opposite each other in the four by four SPAD arrangement 302. The circuits 314 are for example respectively enabled by two enable signals provided by a local memory 322 via a pair of AND gates 324, which perform an AND operation between each of the two enable signals and a row activation signal SPAD_ROWA_EN.

Similarly, the circuits 316 for example receive the outputs of the SPADs 306 and 308 that are diagonally opposite each other in the four by four SPAD arrangement 302. The circuits 316 are for example respectively enabled by two enable signals provided by the local memory 322 via a pair of AND gates 326, which perform an AND operation between each of the two enable signals and a row activation signal SPAD_ROWB_EN.

The local memory 322 for example stores data provided on a data line SPAD_DATA_ROW[3:0]. The local memory 322 is clocked by a column signal SPAD_DATA_COL_N. The local memory 322 for example permits the selective activation of one, two, three or all four of the SPADS in the arrangement 302, based for example on the amount of ambient light. The enable lines SPAD_ROWA_EN and SPAD_ROWB_EN for example permit rows of SPADs to be selectively activated. For example, there are two different modes of operation for SPAD selection.

In one mode, either one, two, three or all four of the SPADs 302 can be enabled, and their outputs are ORed together. In this mode, the enable lines SPAD_ROWA_EN and SPAD_ROWB_EN are static at 1, and the memory 322 is for example used to perform static selection of the number of SPADs to be enabled.

In another mode, two SPADs are each independently coupled to a respective counter, the outputs of these SPADs not being ORed, and the two SPADs are selected in an alternating fashion on a frame to frame basis. In this mode, the memory 322 for example selects all of the SPADs, but the enable signals SPAD_ROWA_EN and SPAD_ROWB_EN are used to select which SPAD duo is active during each frame.

The four input OR gate 318 receives the four outputs from the circuits 314 and 316, and provide the combined output to the combo and gaters circuit 320, which also receives four phase signals PHI0, PHI1, PHI2 and PHI3. The circuit 320 for example directs the output of the OR gate 318 to one of the four bins BIN0, BIN1, BIN2 and BIN3 during four consecutive time intervals based on the phase signals PHI0, PHI, PHI2 and PHI3.

Outputs of the bins BIN0, BIN1, BIN2 and BIN3 are for example coupled via a respective one of four switches to respective lines of an output bus COUNTER_OUT, which is a 12-bit bus in the example of FIG. 3, each bin for example providing a 4-bit output value. The four switches are for example controlled by a decoder (DEC) 328 based on a bin selection signal BIN_SELECT[1:0] and a read enable signal READ_ENABLE.

In some embodiments, an auto stop detector (AUTO STOP DET) 330 detects when any of the four bins is full, and when this occurs, disables the circuits 314 and 316. A signal AUTO_STOP_SEL[3:0] is for example used to program the saturation level above which the SPADs are stopped.

All of the control signals entering the pixel circuit 202 in the example of FIG. 3 are for example provided by the control circuit 104 of FIG. 1.

Figure 4:
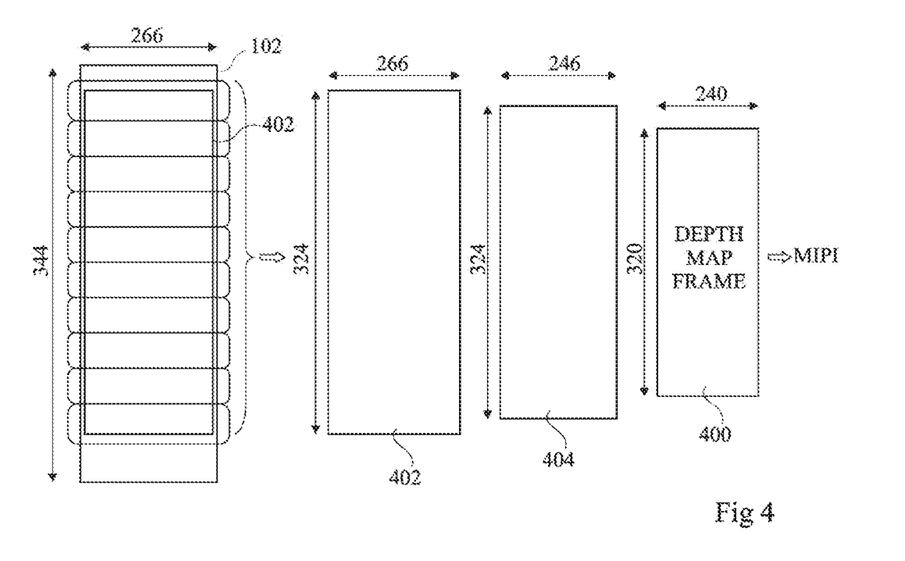
FIG. 4 represents a frame format according to an example embodiment.

FIG. 4 represents a frame format of a depth map obtained using the array 102 of FIGS. 1 and 2 according to an example embodiment. The array 102 is for example oversized with respect to the final output depth map in order to allow optical centering to be managed.

In the example of FIG. 4, the array comprises 266 by 344 pixel circuits, which is reduced to a depth map frame (DEPTH MAP FRAME) 400 having a size of 240 by 320 pixels. For example, as represented by a frame 402, array addressing introduces a Y crop to 324 pixels corresponding to 32 clusters of 8 rows, and 2 clusters of 17 rows. As represented by a frame 404, a sequencer controlling the data actually read out from the array for example introduces an X crop to 246 pixels. Further cropping is then for example performed by image signal processing (ISP) of the raw data to produce the final depth and amplitude image from the bins.

As will be described in more detail below, embodiments of the present disclosure permit the depth map sensor 100 of FIG. 1 to generate a depth map either using iToF such that the depth map has full resolution, for example a frame size of 240 by 320 pixels in the example of FIG. 4, or using dToF such that the depth map has reduced resolution, for example a frame size of 15 by 20 pixels in the example of FIG. 4.

Figure 5:
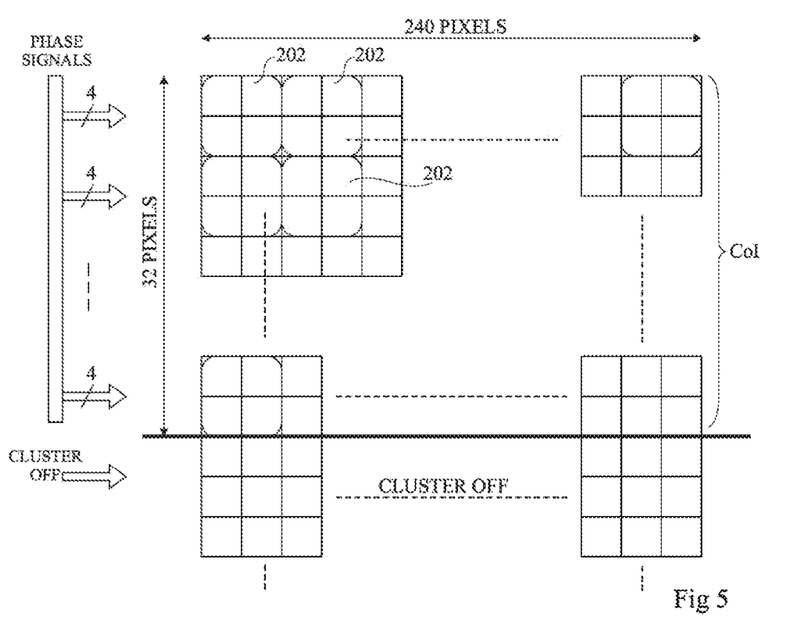
FIG. 5 schematically illustrates a pixel cluster during iToF operation according to an example embodiment of the present disclosure.

FIG. 5 schematically illustrates a pixel cluster during iToF operation according to an example embodiment of the present disclosure. For example a cluster in the example of FIG. 5 corresponds to 10 rows of pixel circuits. As each pixel circuit for example comprises a 2 by 2 arrangement of SPADs, a cluster of interest (CoI) for example corresponds to 240 by 32 pixels, corresponding to 16 rows of pixel circuits. A cluster of interest for example corresponds to an active cluster which is illuminated, other clusters being off. All of the pixel circuits forming the cluster of interest are for example controlled to operate in parallel based on the same set of phase signals (PHASE SIGNALS), i.e. the signals PHI0 to PHI3 of FIG. 3. These phase signals are combined by the circuit 320 of FIG. 3 to generate clock gating signals, as will now be described with reference to FIG. 6.

Figure 6:
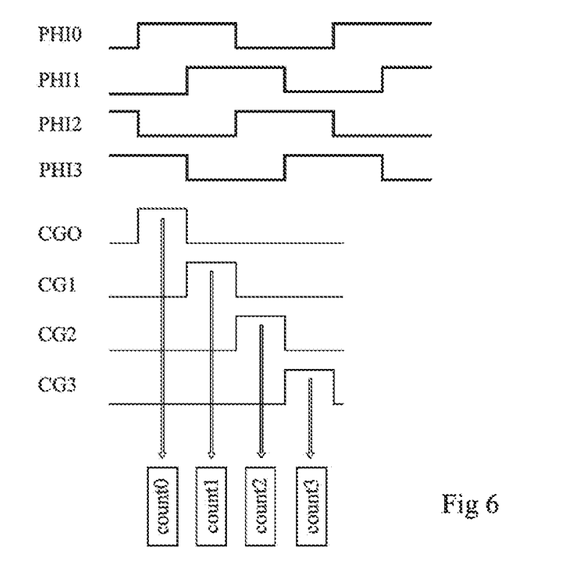
FIG. 6 is a timing diagram representing signals in a pixel circuit of a cluster of FIG. 5 according to an example embodiment.

FIG. 6 is a timing diagram representing signals in a pixel circuit of a cluster of FIG. 5 according to an example embodiment. Each of the phase signals PHI0 to PHI3 is for example a square wave having the same period. As illustrated, the phase signals PHI0 to PHI3 are for example phase shifted with respect to each other such that the signal PHI0 is at 0°, the signal PHI1 is at 90°, the signal PHI2 is at 180° and the signal PHI3 is at 270°. These signals are for example combined to generate the following signals. A clock gating signal CG0, which is high only between 0° and 90°, for example by an AND operation between the phase signals PHI0 and PHI3, causes a signal to be stored to the bin BIN0 and thus generate a count value count0. A clock gating signal CG1, which is high only between 900 and 180°, for example by an AND operation between the phase signals PHI1 and PHI0, causes a signal to be stored to the bin BIN1 and thus generate a count value count1. A clock gating signal CG2, which is high only between 180° and 270°, for example by an AND operation between the phase signals PHI1 and PHI2, causes a signal to be stored to the bin BIN2 and thus generate a count value count2. A clock gating signal CG3, which is high only between 2700 and 0°, for example by an AND operation between the phase signals PHI2 and PHI3, causes a signal to be stored to the bin BIN3 and thus generate a count value count3.

During iToF operation, these clock gating signals permit a phase shift of up to 360 to be detected of the VCSEL signal reflected in the image scene, as will now be described in more detail with reference to FIG. 7.

Figure 7:
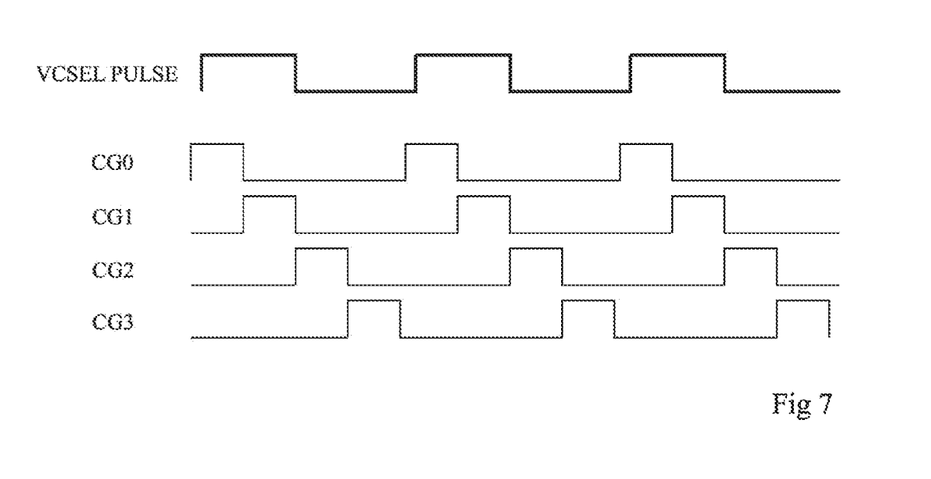
FIG. 7 is a timing diagram representing time intervals of sampling bins of a return wave with respect to a transmitted VCSEL wave.

FIG. 7 is a timing diagram representing time intervals of sampling bins of a return wave with respect to a transmitted VCSEL wave or pulse (VCSEL PULSE). By detecting over many periods of the VCSEL wave the return signal falling in each of the four time intervals defined by the clock gating signals CG0, CG1, CG2 and CG3, it is possible to detect the phase of the return signal with respect to the phase of the transmitted signal, and thereby deduce the time of flight of the optical wave.

Figure 8:
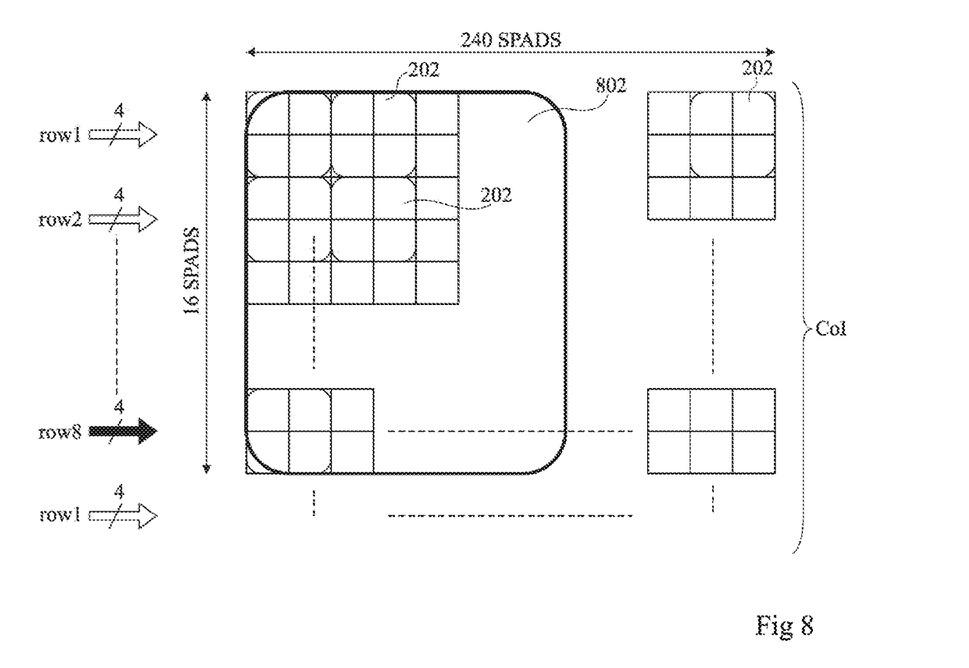
FIG. 8 schematically illustrates a pixel cluster during dToF operation according to an example embodiment of the present disclosure.

FIG. 8 schematically illustrates a pixel cluster during dToF operation according to an example embodiment of the present disclosure.

As shown in FIG. 8, during dToF operation, the spatial resolution is reduced to macro pixels 802, which comprise a plurality of the pixel circuits 202. In the example of FIG. 8, each macro pixel 802 comprises a 16 by 16 group of SPADS, corresponding to an 8 by 8 group of pixel circuits in the case that each pixel circuit comprises a 2 by 2 arrangement of SPADs. The macro pixels 802 of a cluster of interest Col, which may comprise one or more rows of macro pixels, are illuminated by the VCSEL and are for example active at the same time.

Figure 9:
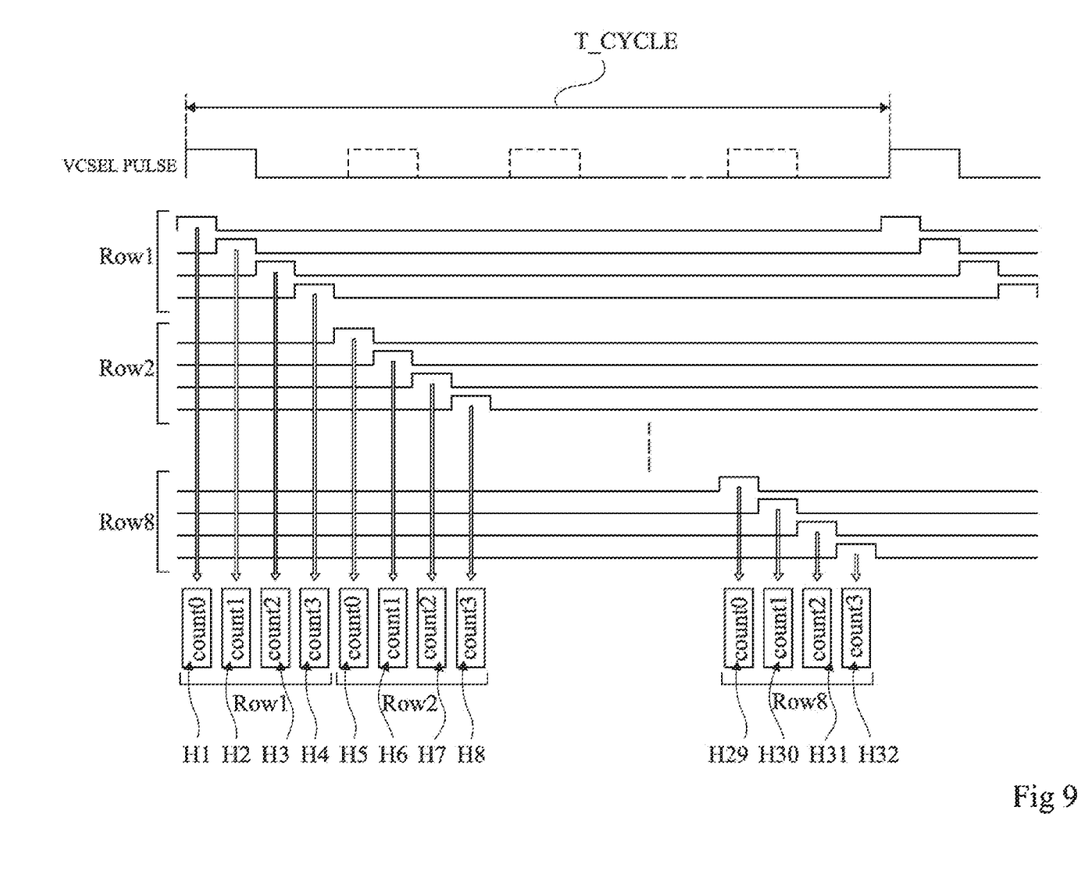
FIG. 9 is a timing diagram representing signals during dToF operation according to an example embodiment of the present disclosure.

FIG. 9 is a timing diagram representing signals during dToF operation according to an example embodiment of the present disclosure.

As shown in FIG. 9, in some embodiments, the rows row1 to row8 of each macro pixel are each used to generate different histogram bins. For example, each of the four bins of each of the eight rows of pixel circuits is used to sample a different time interval over a cycle T_CYCLE between consecutive pulses of the VCSEL wave. Thus, in the example of FIG. 9, there are 32 histogram bins H1 to H32. An example of the VCSEL pulse is shown in which the pulses usually present after the first pulse in each cycle T_CYCLE during iToF operation are represented in a dashed line and are no longer transmitted. The timing of the rows Row2 to Row8 are however still timed with respect to the timing of these pulses such that the histogram bins H5 to H32 correspond to regularly spaced time intervals throughout the cycle T_CYCLE.

T_CYCLE is for example equal to the total number of bins of the histogram, multiplied by the bin time width. In some embodiments, T_CYCLE is in the range 10 to 500 ns, depending on the depth of field to be captured. For example, in one embodiment, there are 32 histogram bins each of 1 ns, leading to a time T_CYCLE of 32 ns.

The histograms H1 to H32 are for example accumulated over many cycles of VCSEL pulses, for example over between 50 and several thousand cycles. In one embodiment, the histogram period, or T_CYCLE, is repeated to fill a cluster integration period of between 10 and 500 μs, and in one example of 69 μs. For example, the count values count0 to count3 accumulated in each pixel circuit are read out at the end of each cluster integration period.

It will be noted that the rows Row1 to Row8 are spatially distributed, albeit over a relatively small distance. In some embodiments, to provide spatial averaging, the rows used to capture each set of histogram bins is varied between cycles. For example, the row Row1 is used to capture the histogram bins H1 to H4 in a first cycle, the histogram bins H5 to H8 in second cycle, and so on until the eighth cycle in which the row Row1 is used to capture the histogram bins H29 to H32. The sequence then for example repeats.

Of course, the number of pixel circuits forming each dToF macro pixel, and the number of histogram bins that are accumulated within each macro pixel, will depend on the application. Using eight rows of pixel circuits to capture 32 histogram bins is merely one example, and more generally any plurality of rows could be used to capture eight or more histogram bins.

Furthermore, while in the example of FIG. 9 each pixel circuit is used to capture four histogram bins, this will depend on the number of counters present in each pixel circuit, and in some embodiments only some of the counters could be used, depending on the desired time granularity of the histogram time intervals.

For example, the mode of operation represented in FIG. 9 is implemented by the control circuit 104 of FIG. 1, which for example gates the phases signals to the time gaters 320, while maintaining ON the row enable signals SPAD_ROWA_EN and SPAD_ROWB_EN. Alternatively, it would also be possible to use the row enable signals SPAD_ROWA_EN and SPAD_ROWB_EN to selectively enable only certain rows during each cycle. As described in relation with the iToF mode of operation, in the dToF mode of operation, the array is for example scanned such that clusters of interest are activated in synchronization with the scanning of the VCEL. For example, there is a ping-pong operation between adjacent clusters, wherein one cluster integrates over an integration period, for example of 69 μs, while another cluster reads out to memory, and then the roles inverse, or vary in a rolling manner through the array. The process duration depends on the available time linked to the overall frame rate.

Figure 10:
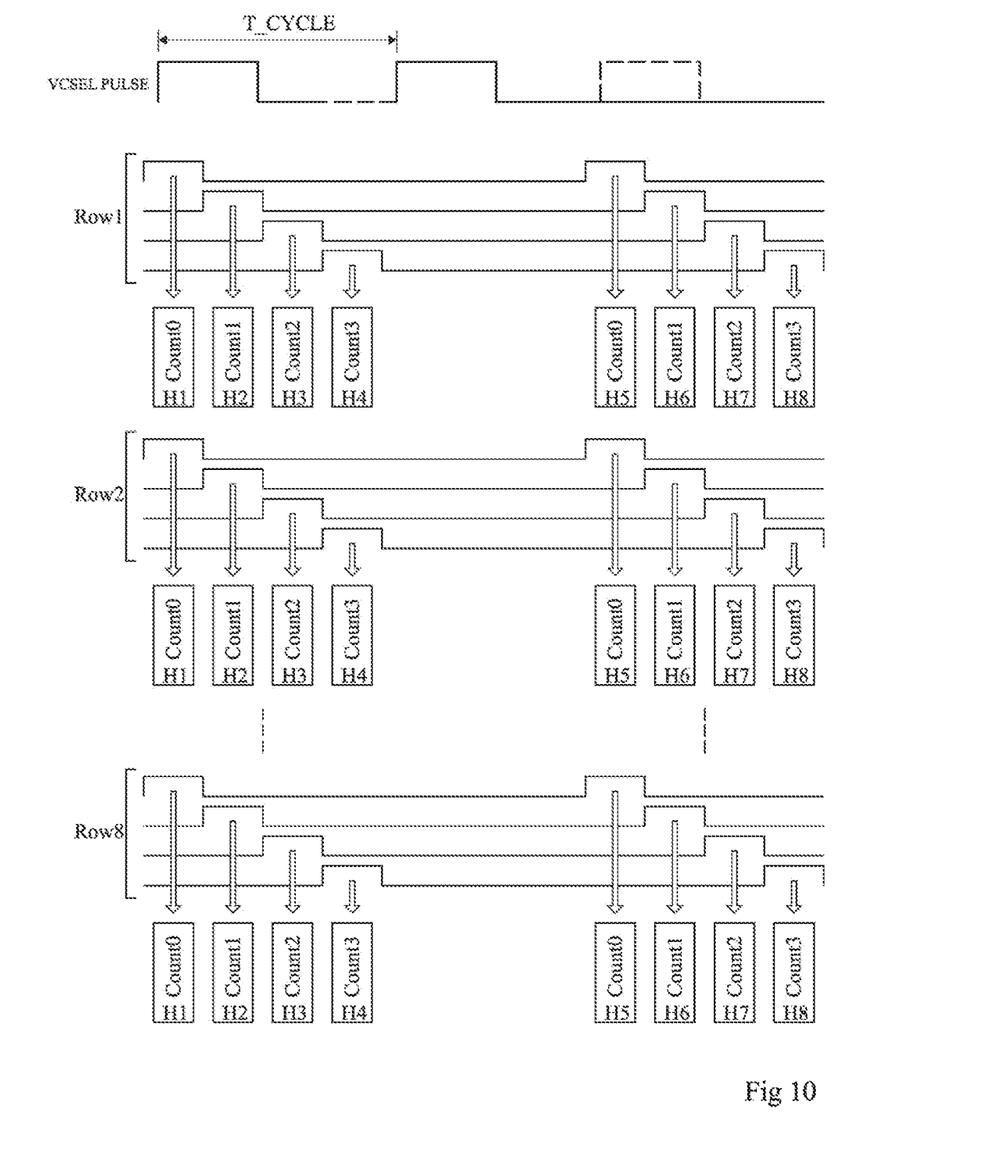
FIG. 10 is a timing diagram representing signals during dToF operation according to a further example embodiment of the present disclosure.

FIG. 10 is a timing diagram representing signals during dToF operation according to a further example embodiment of the present disclosure.

The example of FIG. 10 is similar to that of FIG. 9, except that only four histogram bins are captured during each cycle using all of the rows of the macro pixels, different histogram bins being captured in each cycle. FIG. 10 illustrates a first cycle in which the histogram bins H1 to H4 are captured, and a second cycle in which the histogram bins H5 to H8 are captured. The histogram bins H9 to H32 can for example be captured over the six subsequent cycles, before repeating the sequence. Again, like in the embodiment of FIG. 9, the size of the dToF macro pixels, and the number and time granularity of the histogram bins could be varied in the embodiment of FIG. 10.

Furthermore, the mode of operation represented in FIG. 10 is also for example implemented by the control circuit 104 of FIG. 1, as described above in relation with FIG. 9.

In some embodiments, the dToF operation described in relation with FIGS. 9 and 10 could be performed to generate histograms having different bin granularities in time. For example, one or more first frames could be captured with histograms having relatively coarse bin granularity, for example with each histogram having a time interval of 2 ns or more, and for example of at least 5 ns. One or more second frames could be captured with histograms having relatively fine bin granularity, for example with each histogram having a time interval of 1 ns or less, and for example of between 0.5 and 1 ns, such as of 0.625 ns. In some embodiments, during the dToF operation, an interlacing scheme could be implemented in which there is an alternation between frames having coarse and fine granularities. This has the advantage of permitting a broad range of distances to be detected without ambiguity using the coarse frames, and a relatively high distance accuracy using the fine frames.

In some embodiments, the dToF operation as described above is used to detect cross-talk in the depth map sensor prior to using the iToF operation to generate a high resolution depth map in which the cross-talk can be corrected, as will now be described in more detail with reference to FIGS. 11 to 13.

Figure 11:
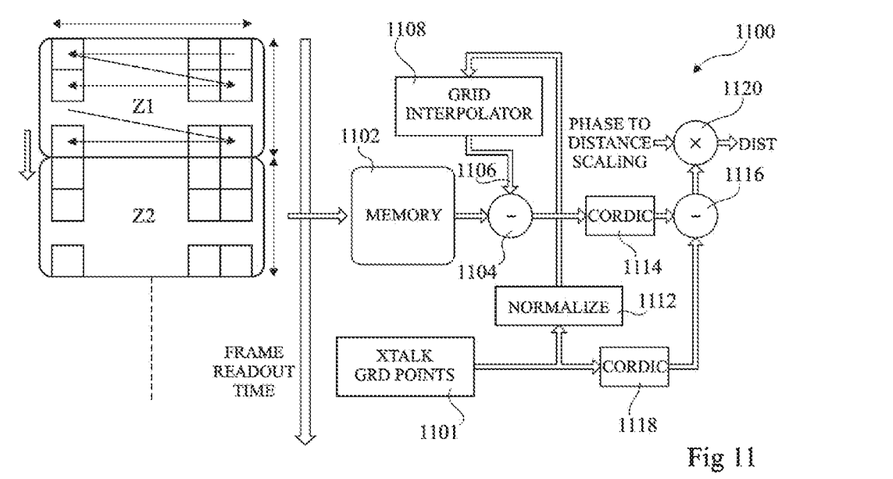
FIG. 11 schematically illustrates a cross-talk compensation circuit according to an example embodiment of the present disclosure.

FIG. 11 schematically illustrates a cross-talk compensation circuit 1100 according to an example embodiment of the present disclosure.

As known by those skilled in the art, cross-talk, also sometimes written Xtalk, is a parasitic signal reflected into the return array from the cover glass above the depth map sensor. It is generated by internal reflections and scattering from the laser emitted through the cover glass.

The presence of cross-talk means that each pixel in the return array of the depth map sensor sees the sum of two signals, the nominal target (signal/amplitude and distance), and the cross-talk parasitic target (signal/amplitude and distance), but the distance is very close, for example between 0 and 1 mm, as the reflection is very close to the return array.

In iToF operation, a single value of the modulated phase is computed and the distance is computed from the modulated phase as a scaled value. Cross-talk adds a phase offset that depends on the relative phase between the primary target and the cross-talk target, and also on the relative amplitudes of each.

If the cross-talk bin to bin contribution is known, it can be subtracted bin to bin, leaving only the return signal which is of interest.

FIG. 11 illustrates an example of how cross-talk can be removed based on cross-talk grid points (XTALK GRID POINTS) 1101 obtained using the dToF operation.

For example, during iToF operation, readings read from the array during frame readout of each cluster (FRAME READOUT TIME) are stored to a memory (MEMORY) 1102 of the depth map sensor. Each read frame is then processed, for example pixel by pixel, to subtract, using a subtractor 1104, a cross-talk estimation 1106 provided by a grid interpolator (GRID INTERPOLATOR) 1108. For example, the grid interpolator provides a compensation values based on the cross-talk grid points 1101 after normalization (NORMALIZE) 1112 of these points, which are of lower resolution than the frame to be corrected. The result of the subtraction is for example provided to a CORDIC (Coordinate Rotation Digital Computer) processor 114, which computes the phase and amplitude from a real and imaginary form provided by the vectorial sum of the bins. In some embodiments, a subtractor 1116 then subtracts a reference distance, corresponding to the real 0 distance, after processing by a further CORDIC processor 1118. The distance measurement (DIST) is then for example generated by multiplying, using a multiplier 1120, the result with a phase to distance scaling parameter (PHASE TO DISTANCE SCALING) in a standard manner.

Figure 12:
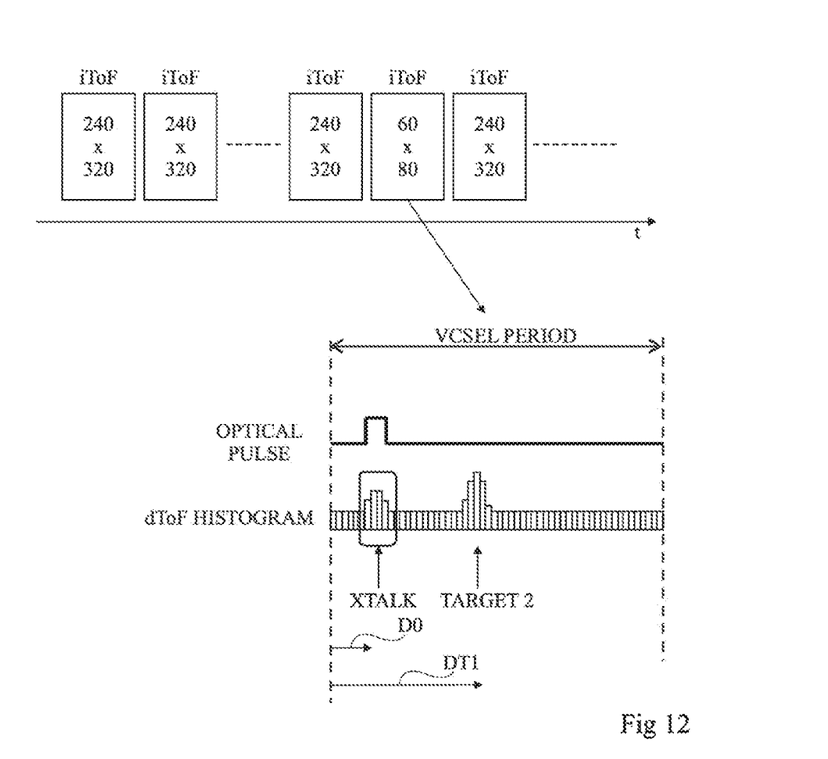
FIG. 12 is a timing diagram representing cross-talk compensation according to an example embodiment of the present disclosure.

FIG. 12 is a timing diagram representing cross-talk compensation according to an example embodiment of the present disclosure.

As shown in FIG. 12, in some embodiments, depth maps are generated in the iToF mode, and periodically, when the target or targets are far enough away to enable cross-talk detection, dToF operation is temporarily performed. For example, cross-talk detection is performed if the target or targets are at least 30 or 40 cm away.

During the cross-talk detection, a dToF frame is for example generated, and the dToF histogram of each macro pixel for example indicates the cross-talk histogram that is present. Indeed, FIG. 12 shows an example in which the dToF histogram (dToF HISTOGRAM) identifies cross-talk (XTALK) present at a distance Do close to 0 mm, and the target TARGET 1 at a distance DT1, which is the target previously identified in the iToF mode as being relatively far.

This histogram for each macro pixel can then be used to generate a cross-talk compensation grid having a compensation value for each macro pixel, which corresponds to a zone of several pixels in the iToF image. For example, a sum is made of all of the bins contained in the cross-talk pulse, assuming for example a pulse width equal to the VCSEL pulse. These sums are then used to produce the cross-talk grid points 1101 of FIG. 11 to be used for cross talk compensation.

An advantage of the embodiments described herein is that, by permitting a dToF operation using a pixel array adapted to at an iToF operation, advantages of dToF can be brought to the iToF operation. These advantages include for example cross-talk compensation.

Furthermore, it would be possible to use coarse and/or fine dToF frames. For example, an advantage of performing dToF operation with a relatively fine histogram bin width is that this helps reduce the distance noise frame to frame (standard deviation) with respect to iToF operation. This also allows filtering to be applied to iToF frames to remove ambiguity due to wrap around. In particular, a coarse dToF frame is for example used to determine a coarse distance of a target. A fine iToF reading, having a relatively low modulo due to a relatively high frequency of pulses, can then provide a more precise distance, which can be interpreted unambiguously thanks to the coarse distance obtained by the dToF. Thus, the readings from the dToF and iToF frames can be complementary.

Various embodiments and variants have been described. Those skilled in the art will understand that certain features of these embodiments can be combined and other variants will readily occur to those skilled in the art.

For example, while embodiments based on a scanned light source and a scanned photodetector array have been described, in alternative embodiments, no scanning is implemented.

What is claimed is:

1. A depth map sensor comprising:
   a light source for transmitting light pulses into an image scene;
   an array of pixel circuits, each pixel circuit of the array of pixel circuits comprising a photodetector and asynchronous counters that comprises a first, a second, and a third asynchronous counter; and
   a control circuit configured to control each of a plurality of groups of the array of the pixel circuits to generate a histogram of detection events by accumulating events during eight distinct time intervals between consecutive light pulses transmitted by the light source, wherein the histogram comprises eight or more histogram bins, wherein the number of histogram bins is greater than the number of asynchronous counters of each pixel circuit.

2. The depth map sensor of claim 1, wherein the control circuit is configured to control one or more first ones of the array of pixel circuits to accumulate in its asynchronous counters, detection events in three of the eight distinct time intervals, and to control one or more second ones of the array of pixel circuits to accumulate in its three asynchronous counters, detection events in another three of the eight distinct time intervals.

3. The depth map sensor of claim 2, wherein the control circuit is configured to control, during a first cycle between the consecutive light pulses, the first ones of the array of pixel circuits to accumulate the events in the three distinct time intervals and the second ones of the array of pixel circuits to accumulate the events in the another three distinct time intervals.

4. The depth map sensor of claim 2, wherein the control circuit is configured to control, during a first cycle between two consecutive light pulses, the first ones of the array of pixel circuits to accumulate the events in the three distinct time intervals, and during a second cycle between a further two consecutive light pulses, the second ones of the array of pixel circuits to accumulate the events in the another three distinct time intervals.

5. The depth map sensor of claim 4, wherein during the first cycle, the control circuit is configured to control only pixel circuits to accumulate the events in the three distinct time intervals, and during the second cycle, the control circuit is configured to control only pixel circuits to accumulate the events in the another three distinct time intervals.

6. The depth map sensor of claim 1, wherein the light source is a laser light source, such as a vertical cavity surface-emitting laser.

7. The depth map sensor of claim 1, wherein the photodetectors are single photon avalanche diodes.

8. A method of generating a histogram using a depth map sensor, the method comprising:
  transmitting, from a light source, light pulses into an image scene; and
  controlling each of a plurality of groups of pixel circuits of an array of pixel circuits to generate a histogram of detection events by accumulating events during eight distinct time intervals between consecutive light pulses transmitted by the light source, wherein the histogram comprises eight or more histogram bins, wherein each pixel circuit of the array has a photodetector and asynchronous counters that comprises a first, a second, and a third asynchronous counter, and wherein the number of histogram bins is greater than the number of asynchronous counters of each pixel circuit of the array.

9. The method of claim 8, further comprising controlling one or more first ones of the pixel circuits to accumulate in its three asynchronous counters detection events in three of the eight distinct time intervals, and controlling one or more second ones of the pixel circuits to accumulate in its three asynchronous counters detection events in another three of the eight distinct time intervals.

10. The method of claim 9, further comprising controlling, during a first cycle between the consecutive light pulses, the first ones of the array of pixel circuits to accumulate the events in the three distinct time intervals and the second ones of the array of pixel circuits to accumulate the events in the another three distinct time intervals.

11. The method of claim 9, further comprising controlling, during a first cycle between two consecutive light pulses, the first ones of the array of pixel circuits to accumulate the events in the three distinct time intervals, and during a second cycle between a further two consecutive light pulses, the second ones of the array of pixel circuits to accumulate the events in the another three distinct time intervals.

12. The method of claim 11, further comprising controlling during the first cycle only pixel circuits to accumulate the events in the three distinct time intervals, and during the second cycle, only pixel circuits to accumulate the events in the another three distinct time intervals.

13. The method of claim 8, further comprising:
  generating a depth map by generating a first frame of macro pixels each comprising a first histogram based on a first duration of eight distinct time intervals, and generating a second frame of macro pixels each comprising a second histogram based on a second duration of eight distinct time intervals, wherein the first and second durations are not equal, wherein each of the first histogram and the second histogram is generated by the transmitting of the light pulses and the controlling, wherein each of the first and the second histograms comprise eight or more histogram bins.

14. The method of claim 8, further comprising:
  generating a depth map by generating a first frame of macro pixels each comprising the histogram; and
  generating a second frame based on an indirect time of flight, iToF, operation of each pixel circuit of the array.

15. A method of correcting cross-talk in a depth map sensor, the method comprising:
  generating, a histogram for a plurality of zones of an array of pixel circuits, the generating comprising
    transmitting, from a light source, light pulses into an image scene, and
    controlling each of a plurality of groups of pixel circuits of an array of pixel circuits to generate a histogram of detection events by accumulating events during eight distinct time intervals between consecutive light pulses transmitted by the light source, wherein the histogram comprises eight or more histogram bins, wherein each pixel circuit of the array has a photodetector and asynchronous counters that comprises a first, a second, and a third asynchronous counter, and wherein the number of histogram bins is greater than the number of asynchronous counters of each pixel circuit of the array;
  generating, based on the histogram for the plurality of zones, cross-talk grid points representing cross-talk present in each of the plurality of zones; and
  correcting a depth map by subtracting, from one or more histogram bins generated during an indirect time of flight, iToF, operation, cross-talk estimations generated based on the cross-talk grid points.

16. The method of claim 15, further comprising controlling one or more first ones of the pixel circuits to accumulate in its three asynchronous counters detection events in three of the eight distinct time intervals, and controlling one or more second ones of the pixel circuits to accumulate in its three asynchronous counters detection events in another three of the eight distinct time intervals.

17. The method of claim 16, further comprising controlling, during a first cycle between the consecutive light pulses, the first ones of the array of pixel circuits to accumulate the events in the three distinct time intervals and the second ones of the array of pixel circuits to accumulate the events in the another three distinct time intervals.

18. The method of claim 16, further comprising controlling, during a first cycle between two consecutive light pulses, the first ones of the array of pixel circuits to accumulate the events in the three distinct time intervals, and during a second cycle between a further two consecutive light pulses, the second ones of the array of pixel circuits to accumulate the events in the another three distinct time intervals.

19. The method of claim 18, further comprising controlling during the first cycle only pixel circuits to accumulate the events in the three distinct time intervals, and during the second cycle, only pixel circuits to accumulate the events in the another three distinct time intervals.

20. The method of claim 15, further comprising:
   generating a depth map by generating a first frame of macro pixels each comprising the histogram; and
   generating a second frame based on an indirect time of flight, iToF, operation of each pixel circuit of the array.

* * * * *